(12) United States Patent
Goh et al.

(10) Patent No.: US 8,369,401 B1
(45) Date of Patent: Feb. 5, 2013

(54) SYSTEM AND METHOD OF BIT ALLOCATION IN SCENE CHANGE SITUATIONS

(75) Inventors: Kwong Huang Goh, Singapore (SG); Lucas Y. W. Hui, Singapore (SG)

(73) Assignee: STMicroelectronics Asia Pacific PTE Ltd., Singapore (SG)

( * ) Notice: Subject to any disclaimer, the term of this patent is extended or adjusted under 35 U.S.C. 154(b) by 1731 days.

(21) Appl. No.: 10/333,433

(22) PCT Filed: Oct. 6, 2000

(86) PCT No.: PCT/SG00/00175
§ 371 (c)(1),
(2), (4) Date: Sep. 4, 2003

(87) PCT Pub. No.: WO02/30126
PCT Pub. Date: Apr. 11, 2002

(51) Int. Cl.
*H04N 11/02* (2006.01)
(52) U.S. Cl. .................. 375/240.12; 348/700
(58) Field of Classification Search ............ 375/240.12, 375/240.05; 348/700
See application file for complete search history.

(56) References Cited

U.S. PATENT DOCUMENTS

| | | | |
|---|---|---|---|
| 5,532,746 A | 7/1996 | Chang | |
| 5,617,150 A | 4/1997 | Nam et al. | |
| 5,731,835 A | 3/1998 | Kuchibholta | 348/390 |
| 5,832,121 A | 11/1998 | Ando | 382/236 |
| 6,100,931 A * | 8/2000 | Mihara | 375/240.12 |
| 6,173,012 B1 * | 1/2001 | Katta et al. | 375/240.15 |
| 6,535,251 B1 * | 3/2003 | Ribas-Corbera | 375/240.03 |
| 6,621,866 B1 * | 9/2003 | Florencio et al. | 375/240.25 |
| 7,277,483 B1 * | 10/2007 | Eckart | 375/240.03 |

OTHER PUBLICATIONS

Luo, L. et al., "A New Algorithm on MPEG-2 Target Bit-Number Allocation at Scene Changes," IEEE Trans. on Circuits and Systems for Video Tech., 7(5):815-819, Oct. 1997.*
Luo et al., "A New Algorithm on MPEG-2 Target Bit-Number Allocation at Scene Changes"; IEEE Transactions on Circuits and Systems for Video Technology, vol. 7, No. 5, Oct. 1997, pp. 815-819.*
Nam, J. et al., "An Adaptive Rate Control Scheme with Scene Change Detection," in *Proceedings of The International Workshop on HDTV*, 1995, pp. 99-107, XP-000965384.
Yu, Y. et al., "A Fast Effective Scene Change Detection and Adaptive Rate Control Algorithm," in *Proceedings of IPCIP '98 Int'l Conf. on Image Processing*, Chicago, IL, Oct. 4-7, 1998, pp. 379-382.
"International Organisation for Standardisation Organisation Internationale de Normalisation," Telecommunication Stadardization Sector, Document AVC-491b, Version 2, Apr. 1993, 118 pp.

* cited by examiner

*Primary Examiner* — Sath V Perungavoor
*Assistant Examiner* — Christopher Findley
(74) *Attorney, Agent, or Firm* — Seed IP Law Group PLLC

(57) ABSTRACT

The invention relates to a method of bit allocation in a scene change situation during encoding a video sequence. Following a scene change, the picture complexity of the current picture is adjusted so that the bit allocation for the next picture is more accurately estimated.

43 Claims, 3 Drawing Sheets

SYSTEM AND METHOD OF BIT ALLOCATION IN SCENE CHANGE SITUATIONS

FIELD OF THE INVENTION

The present invention relates to bit allocation and rate control in a video encoding system. Particularly, the invention relates to a method of bit allocation following a scene change in a video data sequence.

BACKGROUND OF THE INVENTION

To minimise implementation complexity, the bit allocation scheme in the MPEG-2 Test Model-5 (TM-5) makes use of a complexity measure of a present picture of a certain type (I, P, or B) to estimate the target bit allocation of the next picture of the same type. After a picture of a certain type (I, P, or B) is encoded, the respective "global complexity measure" (Xi, Xp, or Xb) is updated as:

$$Xi = SiQi \quad (1)$$

$$Xp = SpQp \quad (2)$$

$$Xb = SbQb \quad (3)$$

where Si, Sp, Sb are the number of bits generated by encoding this picture and Qi, Qp, and Qb are the average quantization parameters computed by averaging the actual quantization values used during the encoding of all the macroblocks, including skipped macroblocks.

The target number of bits (Ti, Tp, or Tb) for the next picture in a group of pictures (GOP) is computed as:

$$Ti = \max\{R/(1+NpXp/XiKp+NbXb/XiKb), \text{bit\_rate}/(8*\text{picture\_rate})\} \quad (4)$$

$$Tp = \max\{R/(Np+NbKpXb/KbXp), \text{bit\_rate}/(8*\text{picture\_rate})\} \quad (5)$$

$$Tb = \max\{R/(Nb+NpKbXp/KpXb), \text{bit\_rate}/(8*\text{picture\_rate})\} \quad (6)$$

where:
Kp and Kb are "universal" constants dependent on the quantization matrices;
Np and Nb are the number of P-pictures and B-pictures remaining in the current GOP in the encoding order;
R is the remaining number of bits assigned to the GOP; and
R is updated after encoding a picture, as follows:

$$R = R - Si, p, b$$

where Si,p,b is the number of bits generated in the picture just encoded (depending on whether the picture is I, P, or B).

Before encoding the first picture in a GOP (an I-picture):

$$R = G + R$$

$$G = \text{bit\_rate}*N/\text{picture\_rate}$$

N is the number of pictures in the GOP
At the start of the sequence R=0.

The TM-5 bit allocation method is described fully in "International Organisation for Standardisation ISO-IEC/JTCI/SC29/WG11: Coded Representation of Picture and Audio Information, Test Model 5".

In the TM-5 bit allocation method, using the current picture complexity to estimate the next picture bit allocation gives rise to inaccuracies when a scene change occurs in the next picture.

The bit allocation method used in TM-5 to calculate the target number of bits for the next picture is based on the global complexity measure (Xi, Xp, and Xb) of the current picture, which can result in an inaccurate prediction of the target number of bits when a scene change occurs. Referring to FIG. 2, when a scene change occurs, the complexity measure, $X_{p1}$, of the next P-picture (P1) after the scene change will normally be higher.

But since the target number of bits for the P-picture after the scene change is based on the complexity measure of the P-picture before the scene change, the target bits for P1 may be inaccurately predicted. Likewise for the P-picture following P1, the target will be inaccurately predicted as being much higher due to the high complexity measure of P1 being used. The effect of this is that a degradation of picture quality in the several pictures after the scene change will propagate from the encoding error in the first P-picture. To address the problems associated with the scene change situation, an intra-encoding mode can be used to encode a picture which includes a new scene, such as described in U.S. Pat. No. 5,532,746. When a scene change is detected in a P-picture, the picture is allocated with bits corresponding to the intra-coded picture and the picture is coded in an intra-mode. In U.S. Pat. No. 5,832,121, the start of a GOP is determined by detecting a new scene in order to intra-frame code the new scene. These kinds of methods do not have a fixed number of pictures in a GOP during encoding of a sequence, and are not suitable to use for an encoder system which requires a fixed number of pictures in a GOP.

Some methods avoid picture degradation in the scene change situation by allocating more bits to encode the new scene picture. In U.S. Pat. No. 5,731,835, when a scene change occurs, extra bits are allocated to encode the picture, where the number of bits depends on 1) the distance of the P-picture that is about to be coded from the end group of pictures; 2) the number of I-mode macroblocks in the P-picture; 3) ease of coding the I-mode macroblocks in the P-picture; and 4) the number of bits presently in the video buffer verifier (VBV). In this method, the situations where multiple scene changes occur close together may require a significant number of extra bits, and as the extra number of bits is only limited by the potential of a VBV underflow occurrence, it could increase the chance of panic-mode encoding. In panic-mode encoding, only the minimum amount of data required to maintain the integrity of the bitstream is transmitted, which significantly degrades the picture encoding quality.

In U.S. Pat. No. 5,617,150, SUBGOPs are defined as sets of 2-4 frames in a GOP, and if a scene change is found in a subsequent SUBGOP, bit allocation adjustment is made to save bits in the current SUBGOP, and when a scene change is found in the current SUBGOP, extra bits are assigned to the current SUBGOP. As this method requires detection of a scene change in a subsequent SUBGOP before bits assignment, there is an undesirable encoding latency. Also, as bits are saved in the current SUBGOP so as to be used in next SUBGOP, it is only suitable for constant bit-rate applications, as using bits saved from previous pictures is not necessary in variable bit-rate applications.

When a scene change occurs, the first P-picture after the scene change will generally be difficult to encode and will need more bits because of the intra-mode coding required. B-pictures are not affected as much due to the usual bi-directional motion estimation thereof. In addition, because the error in the P-picture will propagate, it is important to minimise the degradation in quality of the first P-picture after a scene change.

It is an object of this invention that the above inaccurate bit allocation estimation problems of TM-5 are addressed by correcting the picture complexity value that is used to estimate the bit allocation for the next picture, or that it at least provides a useful alternative. This inaccuracy problem applies to the two subsequent P-pictures that follows the scene change as both of these P-pictures have inaccurate picture complexity values used for their bit allocation assignment. By adjusting the picture complexity value following the scene change detection to give a more accurate bit allocation to the two P-pictures after the scene change, this method can be used for encoder bit-rate control for both constant bit-rate and also variable bit-rate schemes. It should be noted that reducing the'bit allocation for other pictures to compensate for the increase in bit allocation for scene change is not necessary for variable bit-rate applications.

It is noted that for multiple scene changes close together, for example scene changes which occur every 2 to 3 frames, the increased target bit allocation for every scene change is not realistic in constant bit-rate applications. Also, human visual acuity is generally not able to sensibly interpret such an apparently 'continuous' scene change.

SUMMARY OF THE INVENTION

The present invention provides a method of bit allocation for use in a video encoding system adapted to encode video data representing a group of pictures (GOP), the method including the steps of:
- processing said video data to detect a scene change within the GOP;
- increasing a first picture complexity value of a first P-picture in the GOP to be encoded following detection of the scene change by a predetermined factor;
- determining a first target bit allocation for encoding the first P-picture based on the increased first picture complexity value; and
- allocating a first number of bits for encoding the first P-picture based on said first target bit allocation.

The present invention further provides a video encoding system adapted to encode video data including a group of pictures (GOP) the system including:
- a scene change detection module for detecting a scene change within the GOP;
- a picture complexity module for increasing a first picture complexity value of a first P-picture in the GOP to be encoded following detection of the scene change by a predetermined factor;
- a bit allocation module for determining a first target bit allocation for encoding the first P-picture based on the increased first picture complexity value and allocating a first number of bits for encoding the first P-picture based on said first target bit allocation.

Preferably, operation of the picture complexity measurements and the bit allocation estimation is similar to the MPEG-2 TM-5 when there is no scene change detected, yet when a scene change is detected, the picture complexity that is to be used to compute the bit allocation of the subsequent two P-pictures after the scene change is adjusted so that their bit allocation is more accurately estimated.

It is considered that an increased target bit allocation for every scene change in a close multiple scene change situation is unnecessary and inefficient for constant bit-rate application, so preferably the above picture complexity adjustment is only applied to scene changes that are at least a certain period of time apart. For example, if the number of frames in between two scene changes is less than a pre-determined value, then the picture complexity adjustment is not done.

DETAILED DESCRIPTION OF THE PREFERRED EMBODIMENT

Figure 1:
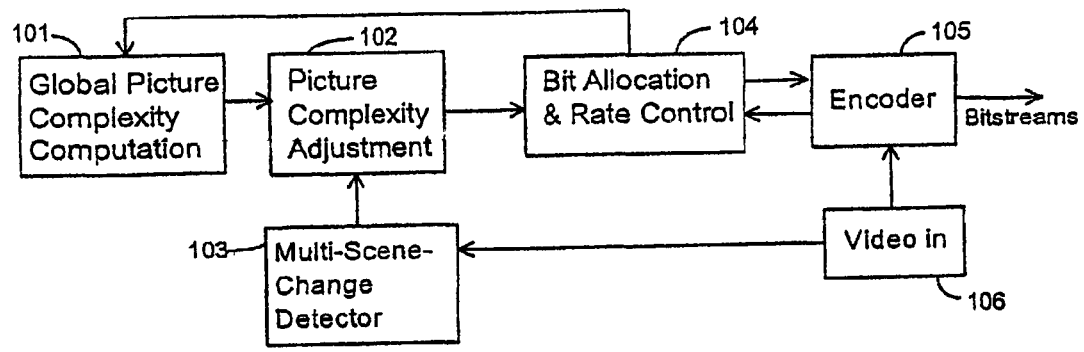
FIG. 1 is a block diagram of a video encoding system.

A video encoder system, as shown in FIG. 1, includes a complexity computation module 101, a complexity adjustment module 102, a bit allocation and rate control module 104, an encoder 105, a video data input source 106 and a scene change detector module 103. The scene change detector 103 is adapted to analyse the video input data from video input source 106 to detect scene changes within that video input data and to provide a scene change output signal to the complexity adjustment module 102 upon detection of a scene change. The complexity computation module 101 determines a complexity computation measure for each I, P or B-picture in a GOP based on feedback from the bit allocation and rate control module 104. The complexity computation module 101 outputs the respective complexity measures for the I, P and B-pictures, based on equations (1), (2) or (3), to the complexity adjustment modules 102, whereupon if a scene change output signal has been received, the complexity measure for the first P-picture detected immediately after the scene change is increased by a factor M. If it is the second P-picture detected after the scene change signal was received, the complexity measure of the second P-picture is decreased by the factor M, or optionally by a different factor K. The complexity measures, with the adjusted P-picture complexity measure, are then passed to the bit allocation and rate control module 104 for bit allocation (according to equations (4), (5) or (6) as appropriate) prior to encoding of the picture by the encoder 105.

Figure 2:
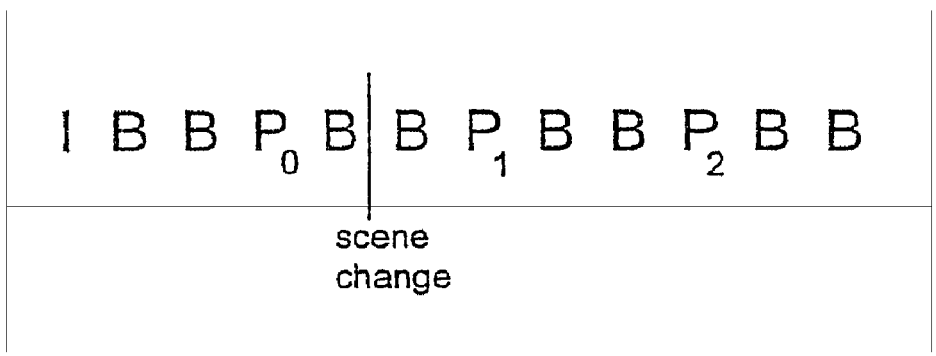
FIG. 2 is an illustration of a group of pictures in which there is a scene change adjustment.

Referring to FIG. 2, in the MPEG-2 TM-5 model, the picture complexity value $Xp_0$ of picture $P_0$ is normally used for calculating the target number of bits ($Tp_1$) for picture $P_1$, based on the assumption that the picture complexity $Xp_0$ is close to $Xp_1$. This assumption is false if a scene change is detected between $P_0$ and $P_1$. Therefore, in embodiments of the invention, to make the target bit allocation $Tp_1$ of picture $P_1$ more accurate, the value $Xp_0$ is increased for the computation of $Tp_1$ so as to increase the target bits allocation. The value of $Xp_1$ is expected to be high due to the scene change, and it would not be accurate to use it for estimation of the target bit allocation of the second P-picture, $Tp_2$, so the value of $Xp_1$ is reduced prior to the computation of $Tp_2$.

Figure 3:
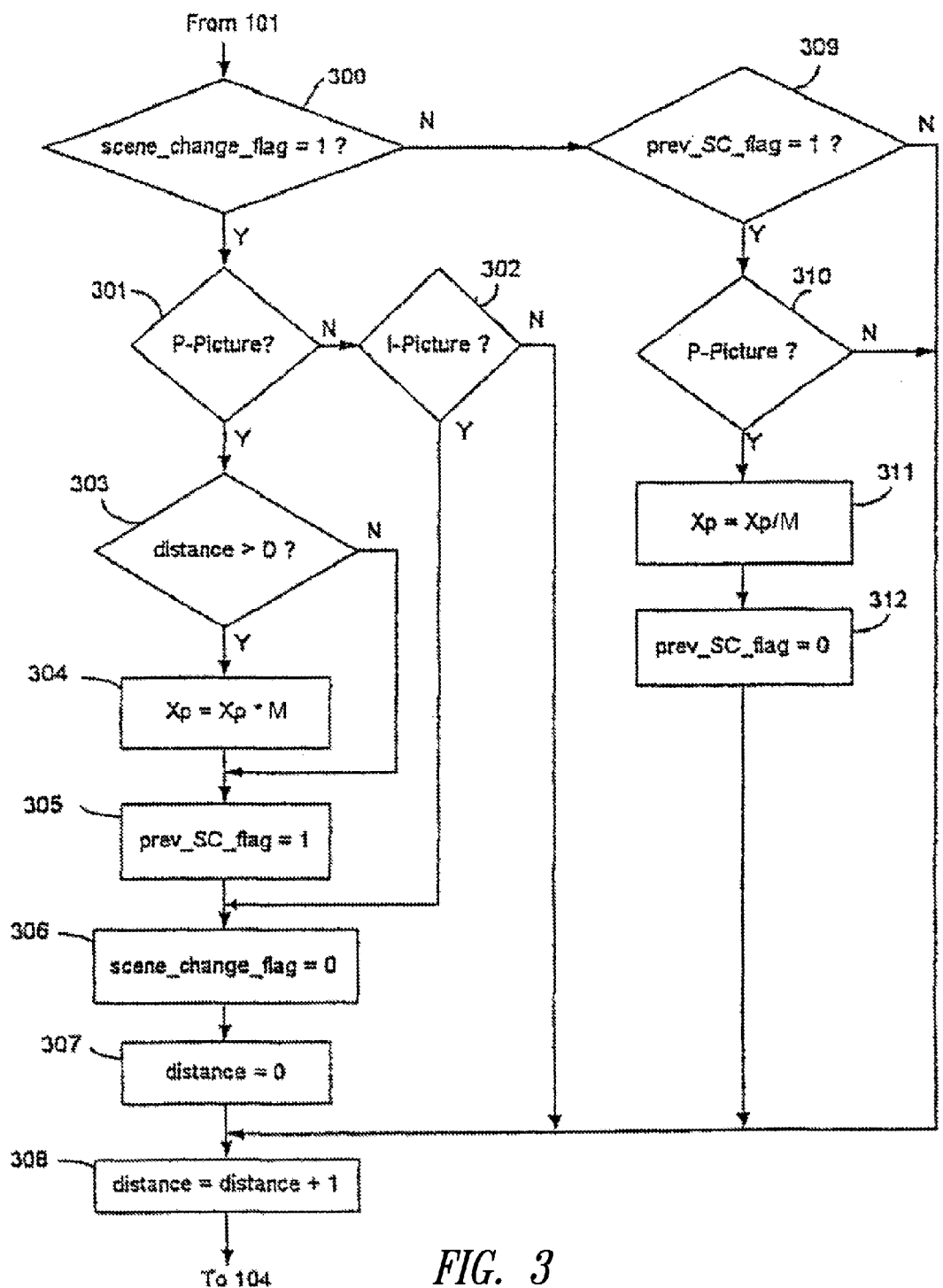
FIG. 3 is a flow diagram of a complexity measure adjustment process executed by a picture complexity adjustment module of the video encoding system.

FIG. 3 shows the detailed flow diagram of a preferred method for picture complexity adjustments in the complexity adjustment module 102. The method is executed for each picture in a GOP. If a scene change is detected at step 300 and a P-picture is to be encoded (step 301), the distance between the current scene change and the previous scene change, is checked at step 303, to see if it is greater than a threshold D. If the distance is greater than D, the picture complexity Xp of the P-picture before the scene change (computed in complexity computation module 10 after it is encoded) is increased at step 304 by a factor M before the target bit allocation is computed. A previous scene change flag (prev_SC_flag) is then set at step 305 so that in the subsequent P-picture, the picture complexity is reduced (step 311) by the factor M before the target bit allocation is computed. If scene change occurs before an I-picture and after the last P-picture of the GOP is checked at step 302, the picture complexity of the P-picture after the scene change is not adjusted as it is not necessary. A scene change flag (scene_change_flag) is set by the scene change detector 103 whenever a scene change is detected and it is only reset by the complexity adjustment module 102, in step 306. Once the scene change flag is reset, the distance counter D is also reset at step 307. If the picture is a B-picture or the scene change flag is not set, the distance counter D is incremented at step 308.

If the scene change flag is not set but the previous scene change flag is set (step 309), then if the picture is a P-picture (step 310), the complexity measure for that picture is reduced by the factor M or K at step 311 and the previous scene change flag is reset at step 312.

The values of M and K can be of an experimentally determined fixed value, for example values of 2 and 1.5. The distance threshold value D can be a predetermined value such as 10 or 15.

Advantageously, the present invention is able to correct the inaccurate bit allocation of the TM-5 model when a scene change occurs, such that the corrected bit allocation for the two subsequent P-pictures results in a better picture quality. The invention can be applied to both constant bit-rate and variable bit-rate control and there is no latency as it does not require checking future pictures to determine whether a scene change occurs.

Advantageously, the invention avoids the situation of unnecessarily allocating extra bits because of multiple scene changes that are close together and the chance of panic-mode encoding due to potential VBV underflow is reduced.

The invention claimed is:

1. A method, comprising:
    allocating, using at least one processing module, bits for use in a video encoding system adapted to encode video data representing a group of pictures (GOP), by:
        processing said video data to detect a scene change within the GOP;
        increasing a first picture complexity value X of a first P-picture in the GOP to be encoded, following detection of the scene change, by a factor having a fixed value, wherein $X=S \times Q$, with S being a number of bits used to encode a picture prior to said scene change and Q being a quantization parameter;
        determining an increased first target bit allocation for encoding the first P-picture based on the increased first picture complexity value of said first P-picture; and
        allocating a first number of bits for encoding the first P-picture based on said increased first target bit allocation.

2. The method according to claim 1, wherein the method of bit allocation is for use in a constant bit-rate video encoding system.

3. The method according to claim 2, wherein the method further comprises:
    before said increasing, determining a distance value representative of a distance between the detected scene change and a previously detected scene change; and
    performing said increasing only if the distance value is greater than a distance threshold value.

4. The method according to claim 1, wherein the method further comprises:
    decreasing a second picture complexity value of a second P-picture in the GOP to be encoded following detection of the scene change by the factor;
    determining a second target bit allocation for encoding the second P-picture based on the decreased second picture complexity value; and
    allocating a second number of bits for encoding the second P-picture based on said second target bit allocation.

5. The method according to claim 1, wherein the method of bit allocation is performed in an implementation of the MPEG-2 Test Model 5 bit allocation scheme.

6. The method of claim 1 wherein the fixed value is one of 1.5 and 2.

7. A video encoding system adapted to encode video data including a group of pictures (GOP), the system including:
    a scene change detection module configured to detect a scene change within the GOP;
    a picture complexity module configured to increase a first picture complexity value X of a first P-picture in the GOP to be encoded, following detection of the scene change, by a factor having a fixed value, wherein $X=S \times Q$, with S being a number of bits used to encode a picture prior to said scene change and Q being a quantization parameter; and
    a bit allocation module configured to determine an increased first target bit allocation to encode the first P-picture based on the increased first picture complexity value of said first P-picture and configured to allocate a first number of bits to encode the first P-picture based on said increased first target bit allocation.

8. The system according to claim 7, wherein the system is a constant bit-rate video encoding system.

9. The system according to claim 8, wherein the picture complexity module is further configured to determine a distance value representative of a distance between the detected scene change and a previously detected scene change, and configured to make a comparison of the distance value and a distance threshold value wherein the complexity value of the first P-picture is only increased if the distance value is greater than the distance threshold value.

10. The system according to claim 7, wherein the picture complexity module is further configured to decrease a second picture complexity value of a second P-picture in the GOP to be encoded following detection of the scene change by the factor; and the bit allocation module is further configured to determine a second target bit allocation for encoding the second P-picture based on the decreased second picture complexity value and to allocate a second number of bits for encoding the second P-picture based on said second target bit allocation.

11. The system according to claim 7, wherein the system is adapted to implement the MPEG-2 Test Model 5 bit allocation scheme.

12. A system to encode video data having a group of pictures (GOP), the system comprising:
    a first module configured to detect a scene change within the GOP;
    a second module coupled to the first module and configured to increase, by a factor having a fixed value, a first picture complexity value X of a first picture of a first type in the GOP to be encoded subsequent to detection of the scene change, wherein $X=S \times Q$, with S being a number of bits used to encode a picture prior to said scene change and Q being a quantization parameter; and
    a third module coupled to the second module and configured to determine an increased first target bit allocation to encode the first picture of the first type, based on the increased first picture complexity value of said first picture, and to allocate a first number of bits to encode the first picture of the first type based on the increased first target bit allocation, wherein the fixed value is one of 1.5 and 2.

13. The system of claim 12 wherein the first picture of the first type comprises a first P-picture.

14. The system of claim 12 wherein the first, second, and third modules comprise part of a constant-bit rate video encoding system.

15. The system of claim 12 wherein the second module is configured to determine a distance value representative of a distance between the detected scene change and a previously detected scene change, and configured to make a comparison of the distance value and a distance threshold value, wherein the second module is configured to increase the complexity value of the first picture of the first type if the distance value is greater than the distance threshold value.

16. The system of claim 12 wherein the second module is further configured to decrease, by the factor, a second picture complexity value of a second picture of the first type in the GOP to be encoded following detection of the scene change, and wherein the third module is further configured to determine a second target bit allocation to encode the second picture of the first type based on the decreased second picture complexity value and to allocate a second number of bits to encode the second of the first type based on the second target bit allocation.

17. The system of claim 12 wherein the third module is adapted to implement a MPEG bit allocation scheme.

18. The system of claim 12 wherein the MPEG bit allocation scheme comprises a MPEG-2 Test Model 5 bit allocation scheme.

19. An apparatus for encoding video data representing a group of pictures (GOP), the apparatus comprising:
 means for detecting a scene change within the GOP;
 means for changing, by increasing by a factor having a fixed value, a first picture complexity value X of a first picture of a first type in the GOP to be encoded subsequent to detection of the scene change, wherein X=S×Q, with S being a number of bits used to encode a picture prior to said scene change and Q being a quantization parameter; and
 means for determining an increased first target bit allocation to encode said first picture of the first type, based on the increased first picture complexity value of said first picture, and for allocating a first number of bits to encode the first picture of the first type based on the increased first target bit allocation.

20. The apparatus of claim 19 wherein said first picture of the first type includes a first P-picture.

21. The apparatus of claim 19 wherein said means for changing includes:
 means for determining a distance value representative of a distance between the detected scene change and a previously detected scene change; and
 means for comparing the distance value and a distance threshold value,
 wherein said means for changing increases the complexity value of the first picture of the first type if the distance value is greater than the distance threshold value.

22. The apparatus of claim 19 wherein said means for changing decreases, by the factor, a second picture complexity value of a second picture of the first type in the GOP to be encoded following detection of the scene change, and wherein the means for determining determines a second target bit allocation to encode the second picture of the first type based on the decreased second picture complexity value and allocates a second number of bits to encode the second of the first type based on the second target bit allocation.

23. The apparatus of claim 19 wherein the fixed value is one of 1.5 and 2.

24. An apparatus to encode video data having a group of pictures (GOP), the apparatus comprising:
 a scene change detector configured to detect a scene change within the GOP;
 a complexity computation module configured to determine picture complexity values for a plurality of types of pictures in said GOP; and
 a complexity adjustment module coupled to the scene change detector and to the complexity computation module and configured to change, by increasing by a factor chosen from a set of fixed factors, the set of fixed factors consisting of factors 1.5 and 2, a first picture complexity value X of a first picture of a first type in the GOP to be encoded subsequent to detection of the scene change, wherein X=S×Q, with S being a number of bits used to encode a picture prior to said scene change and Q being a quantization parameter.

25. The apparatus of claim 24, further comprising a bit allocation module coupled to the complexity adjustment module and configured to determine an increased first target bit allocation to encode said first picture of the first type, based on the increased first picture complexity value, and to allocate a first number of bits to encode the first picture of the first type based on the increased first target bit allocation.

26. The apparatus of claim 24 wherein the chosen factor is 2.

27. The apparatus of claim 24 wherein the chosen factor is 1.5.

28. A method, comprising:
 allocating, using at least one processing module, bits for use in a video encoding system adapted to encode video data representing a group of pictures (GOP), by:
  processing said video data to detect a scene change within the GOP;
  increasing a first picture complexity value X of a first P-picture in the GOP to be encoded, following detection of the scene change, by a factor chosen from a set of fixed numerical factors, wherein X=S×Q, with S being a number of bits used to encode a picture prior to said scene change and Q being a quantization parameter;
  determining an increased first target bit allocation for encoding the first P-picture based on the increased first picture complexity value of said first P-picture; and
  allocating a first number of bits for encoding the first P-picture based on said increased first target bit allocation.

29. The method according to claim 28, further comprising:
 before said increasing, determining a distance value representative of a distance between the detected scene change and a previously detected scene change; and
 performing said increasing only if the distance value is greater than a distance threshold value.

30. The method according to claim 28, further comprising:
 decreasing a second picture complexity value of a second P-picture in the GOP to be encoded following detection of the scene change by the factor;
 determining a second target bit allocation for encoding the second P-picture based on the decreased second picture complexity value; and allocating a second number of bits for encoding the second P-picture based on said second target bit allocation.

31. The method of claim 28 wherein the set of fixed factors consists of factors 1.5 and 2.

32. A video encoding system adapted to encode video data including a group of pictures (GOP), the system including:
a scene change detection module configured to detect a scene change within the GOP;
a picture complexity module configured to increase a first picture complexity value X of a first P-picture in the GOP to be encoded, following detection of the scene change, by a factor chosen from a set of fixed numerical factors, the set of fixed numerical factors including factors 1.5 and 2, wherein X=S×Q, with S being a number of bits used to encode a picture prior to said scene change and Q being a quantization parameter; and
a bit allocation module configured to determine an increased first target bit allocation to encode the first P-picture based on the increased first picture complexity value of said first P-picture and configured to allocate a first number of bits to encode the first P-picture based on said increased first target bit allocation.

33. The system of claim 32 wherein the picture complexity module is further configured to determine a distance value representative of a distance between the detected scene change and a previously detected scene change, and configured to make a comparison of the distance value and a distance threshold value wherein the complexity value of the first P-picture is only increased if the distance value is greater than the distance threshold value.

34. The system according to claim 32 wherein the picture complexity module is further configured to decrease a second picture complexity value of a second P-picture in the GOP to be encoded following detection of the scene change by the factor; and the bit allocation module is further configured to determine a second target bit allocation for encoding the second P-picture based on the decreased second picture complexity value and to allocate a second number of bits for encoding the second P-picture based on said second target bit allocation.

35. A system to encode video data having a group of pictures (GOP), the system comprising:
a first module configured to detect a scene change within the GOP;
a second module coupled to the first module and configured to increase, by a factor chosen from a set of fixed numerical factors, a first picture complexity value X of a first picture of a first type in the GOP to be encoded subsequent to detection of the scene change, wherein X=S×Q, with S being a number of bits used to encode a picture prior to said scene change and Q being a quantization parameter; and
a third module coupled to the second module and configured to determine an increased first target bit allocation to encode the first picture of the first type, based on the increased first picture complexity value of said first picture, and to allocate a first number of bits to encode the first picture of the first type based on the increased first target bit allocation.

36. The system of claim 35 wherein the first picture of the first type comprises a first P-picture.

37. The system of claim 35 wherein the first, second, and third modules comprise part of a constant-bit rate video encoding system.

38. The system of claim 35 wherein the second module is configured to determine a distance value representative of a distance between the detected scene change and a previously detected scene change, and configured to make a comparison of the distance value and a distance threshold value, wherein the second module is configured to increase the complexity value of the first picture of the first type if the distance value is greater than the distance threshold value.

39. The system of claim 35 wherein the second module is further configured to decrease, by the factor, a second picture complexity value of a second picture of the first type in the GOP to be encoded following detection of the scene change, and wherein the third module is further configured to determine a second target bit allocation to encode the second picture of the first type based on the decreased second picture complexity value and to allocate a second number of bits to encode the second of the first type based on the second target bit allocation.

40. An apparatus for encoding video data representing a group of pictures (GOP), the apparatus comprising:
means for detecting a scene change within the GOP;
means for changing, by increasing by a factor chosen from a set of fixed numerical factors, a first picture complexity value X of a first picture of a first type in the GOP to be encoded subsequent to detection of the scene change, wherein X=S×Q, with S being a number of bits used to encode a picture prior to said scene change and Q being a quantization parameter; and
means for determining an increased first target bit allocation to encode said first picture of the first type, based on the increased first picture complexity value of said first picture, and for allocating a first number of bits to encode the first picture of the first type based on the increased first target bit allocation.

41. The apparatus of claim 40 wherein said means for changing includes:
means for determining a distance value representative of a distance between the detected scene change and a previously detected scene change; and
means for comparing the distance value and a distance threshold value,
wherein said means for changing increases the complexity value of the first picture of the first type if the distance value is greater than the distance threshold value.

42. The apparatus of claim 40 wherein said means for changing decreases, by the factor, a second picture complexity value of a second picture of the first type in the GOP to be encoded following detection of the scene change, and wherein the means for determining determines a second target bit allocation to encode the second picture of the first type based on the decreased second picture complexity value and allocates a second number of bits to encode the second of the first type based on the second target bit allocation.

43. The apparatus of claim 40 wherein the set of fixed numerical factors consists of factors 1.5 and 2.

* * * * *